United States Patent Office 2,764,560
Patented Sept. 25, 1956

2,764,560

RESINOUS REACTION PRODUCTS OF HEXA-ALKYLPHOSPHINOUS TRIAMIDES AND CHLOROMETHYLATED VINYL AROMATIC COPOLYMERS

Elmer L. McMaster and Henry Tolkmith, Midland, Mich., assignors to The Dow Chemical Company, Midland, Mich., a corporation of Delaware No Drawing. Application November 2, 1954,
Serial No. 466,441

11 Claims. (Cl. 260—2.1)

This invention concerns new anion exchange resins. It relates more particularly to resinous compositions which are insoluble cross-linked vinyl aromatic copolymers containing as substituents on the aromatic nuclei thereof, quaternary phosphonium groups. The invention also concerns a method of making the compositions.

The resinous compositions of the invention are the reaction products of a hexaalkylphosphinous triamide having the general formula:

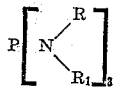

wherein R and $R_1$ each represents an alkyl radical containing from one to four carbon atoms, and an insoluble cross-linked copolymer of one or more monovinyl aromatic compounds and a polyvinyl aromatic compound, which copolymer contains on the aromatic nuclei substituent chloromethyl groups. Thus, the resins are insoluble cross-linked vinyl aromatic copolymers containing on the aromatic nuclei substitutent groups having the formula:

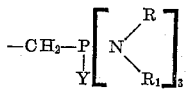

wherein R and $R_1$ each represents an alkyl radical containing from 1 to 4 carbon atoms and Y is an anion, such as a chloride, sulfate, or hydroxyl ion.

The resinous compositions can readily be prepared by first forming an insoluble cross-linked copolymer by copolymerizing a monovinyl aromatic compound, such as styrene, ethylvinylbenzene, or vinyltoluene, with a polyvinyl aromatic compound, e. g. divinylbenzene. Chloromethyl groups are next introduced into the insoluble cross-linked copolymer. The resultant chloromethylated copolymer is then reacted with a hexaalkylphosphinous triamide having the aforementioned formula, whereby there is obtained an insoluble cross-linked polymeric quaternary phosphonium salt. A final washing with an alkali, e. g. an aqueous solution of sodium hydroxide, converts the quaternary phosphonium salt to a quaternary phosphonium hydroxide.

The product, i. e. the quaternary phosphonium hydroxide, is strongly basic. When used in the treatment of acidic fluids, e. g. aqueous acidic solutions, the resin exchanges its hydroxyl groups for the anions present in the fluid with the result that the acidity of the fluid is removed and the quaternary phosphonium hydroxide is converted to a salt.

The insoluble cross-linked vinyl aromatic copolymers to be employed in preparing the compositions are resinous copolymers of from 80 to 99.5 per cent by weight of one or more monovinyl aromatic compounds, such as monovinyl aromatic hydrocarbons of the benzene series or nuclear chlorinated derivatives thereof, and from 20 to 0.5 per cent of a divinyl aromatic hydrocarbon. The monovinyl aromatic compounds may contain in addition to the vinyl group directly attached to a carbon atom of the aromatic nucleus a total of from one to two chlorine atoms, or lower alkyl radicals, each containing from one to three carbon atoms as nuclear substituents. Examples of suitable monovinyl aromatic compounds are styrene, vinyltoluene, vinylxylene, ethylvinylbenzene, ethylvinyltoluene, chlorostyrene, dichlorostyrene, isopropylvinylbenzene, or ar-chlorovinyltoluene. Examples of suitable divinyl aromatic hydrocarbons are divinylbenzene, divinyltoluene, divinylxylene, or ethyldivinylbenzene. Copolymers of at least 80 per cent by weight of styrene, a lesser amount of ethylvinylbenzene and from 0.5 to 10 per cent of divinylbenzene, are preferred.

The copolymers can be prepared by a procedure similar to any of a variety of well-known methods employed for the polymerization of styrene. A mixture of the monomeric materials can be polymerized in bulk, i. e. in the substantial absence of an inert liquid medium, or while dispersed in an aqueous emulsion, or suspension of an inert liquid non-solvent medium. Suspension methods wherein a mixture of the monomeric materials is dispersed in a liquid non-solvent medium, such as water or brine then heated, agitated and copolymerized are preferred because such methods form hard copolymer particles in the form of spheroids, beads, or rounded granules, and the size of the particles can readily be controlled.

The polymerization of the vinyl aromatic compounds is accelerated by the addition of catalysts which provide oxygen, such as benzoyl peroxide, tert.-butyl hydroperoxide, di-tert.-butyl peroxide, di-tert.-butyl diperphthalate, cumene peroxide, or tert.-butyl perbenzoate, or inorganic "per" salts, e. g. sodium persulfate or potassium persulfate. The catalysts are usually employed in amounts of from 0.1 to 2 per cent based on the weight of the monomeric material to be polymerized.

Chloromethyl groups are introduced into the insoluble cross-linked copolymers by reacting small particles of the copolymer with a chloromethylating agent, such as a mixture of paraformaldehyde and hydrochloric acid, or chloromethyl methyl ether and a Friedel-Crafts catalyst, e. g. zinc chloride, stannic chloride, or aluminum chloride. Methods of chloromethylating which may be employed for introducing the chloromethyl group onto aromatic nuclei of the insoluble cross-linked copolymer are described in "Organic Reactions," vol. I, chapter 3, page 63 (John Wiley & Sons, Inc., New York city). The preferred method is to treat the copolymer in the form of small particles with chloromethyl methyl ether and a Friedel-Crafts catalyst at temperatures between 20° and 60° C.

The extent of the chloromethylation reaction can readily be determined by analysis. It is desirable that as many chloromethyl groups as possible be introduced into the copolymer because the number of such groups determines the number of quaternary phosphonium groups in the final product. The number of quaternary phosphonium groups determines the capacity of the resin to absorb anions from fluids.

The chloromethylation reaction is usually continued until the copolymer contains at least two, preferably from four to ten, substituent chloromethyl groups for every ten aromatic nuclei in the copolymer.

In an alternate procedure, vinyl aromatic copolymers containing chloromethyl groups on the aromatic nuclei can readily be prepared by reacting an insoluble cross-linked copolymer of one or more ar-methyl monovinyl aromatic compounds, such as vinyltoluene or vinylxylene, and a divinyl aromatic hydrocarbon, e. g. divinylbenzene, with chlorine, whereby a chlorine atom is substituted for a hydrogen atom on a methyl radical in the copolymer.

The chlorination of the copolymer is carried out by treating the finely-divided insoluble cross-linked copolymer with chlorine in the presence of a halogenation catalyst, such as phosphorus, phosphorus trichloride, or ultraviolet light, promoting substitution of chlorine in the side chains, while the particles of copolymer are dispersed in, or swollen by, an inert organic liquid, such as carbon tetrachloride, ethylene dichloride, chlorobenzene, acetic acid, or ortho-dichlorobenzene. The chlorination reaction is carried out at temperatures between 20° and 150° C. and at atmospheric or substantially atmospheric pressure.

The chlorination of the insoluble cross-linked copolymer to effect the substitution of a chlorine atom for a hydrogen atom on methyl radicals in the copolymer usually results, at least to some extent, in the substitution of chlorine atoms on aromatic nuclei in the copolymer, but such nuclear chlorination is not disadvantageous.

The extent of the chlorination can conveniently be determined by analysis. The copolymer is usually reacted with from 0.5 to 2 gram molecular proportions of chlorine for each methyl radical on a gram molecular equivalent proportion of the copolymer. The chlorinated insoluble cross-linked copolymers containing on the aromatic nuclei, at least two, preferably from four to ten chloromethyl groups for every ten aromatic nuclei in the copolymer can be employed as starting materials in preparing the resinous compositions of the invention.

The resinous compositions are prepared by reacting a hexaalkylphosphinous triamide having the aforementioned general formula, e. g. hexamethylphosphinous triamide, or hexaethylphosphinous triamide, with the insoluble cross-linked copolymer containing chloromethyl groups on its aromatic nuclei, whereby a polymeric quaternary phosphonium salt is formed.

The reaction of the hexaalkylphosphinous triamide with the copolymer containing chloromethyl groups on its aromatic nuclei is carried out at temperatures between 60° and 150° C., preferably from 80° to 120° C., and at atmospheric or superatmospheric pressures. The reaction is usually carried out by heating the finely-divided copolymer containing chloromethyl groups on aromatic nuclei thereof, in admixture with the hexaalkylphosphinous triamide at a refluxing temperature at atmospheric pressure. The reaction is preferably carried out while the copolymer is dispersed in, or wet with, an organic liquid which swells the copolymer, such as benzene, toluene, chlorobenzene, or ortho-dichlorobenzene.

After completing the reaction, the product, i. e. the polymeric quaternary phosphonium salt, is separated from the unreacted, or excess, hexaalkylphosphinous triamide, or the liquid reaction medium, in usual ways, e. g. by filtering. A final washing of the product with an aqueous solution of an alkali, e. g. sodium hydroxide, converts the quaternary phosphonium salt to the quaternary phosphonium hydroxide.

The following examples illustrate ways in which the principle of the invention has been applied, but are not to be construed as limiting its scope.

*Example 1*

Two cubic centimeters of beads of a chloromethylated copolymer of 90 per cent by weight of styrene, 4 per cent of ethylvinylbenzene and 6 per cent of divinylbenzene, together with 10 cc. of hexaethylphosphinous triamide, was sealed in a glass tube and heated at a temperature of 150° C. for a period of 20 hours, then allowed to cool to room temperature. The chloromethylated copolymer employed in the experiment contained 19.4 per cent by weight of chlorine by analysis, and was in the form of beads of sizes between 20 and 50 mesh per inch as determined by U. S. Standard screens. After cooling, the glass tube was opened and the copolymer product removed. The product was washed with water, then with acetone and again washed with water. A final washing with an aqueous solution of sodium hydroxide converted the polymeric product to the quaternary phosphonium hydroxide, after which it was washed with water. The product had an anion exchange capacity corresponding to 22,000 grains of calcium carbonate per cubic foot of a bed of the resin particles. The beads were capable of repeated use in absorbing anions and being regenerated.

*Example 2*

A charge of 3 cc. of a batch of beads of a chloromethylated copolymer of 98.5 per cent by weight of styrene, 1 per cent of ethylvinylbenzene and 0.5 per cent of divinylbenzene, together with 15 cc. of hexaethylphosphinous triamide and 6 cc. of benzene, was sealed in a glass pressure bottle and heated at a temperature of 74° C. for a period of 48 hours, then cooled. The chloromethylated copolymer employed in the experiment contained 19.3 per cent by weight of chlorine by analysis. The copolymer product was removed from the bottle, separated from the liquid and was washed with water, with acetone and again washed with water. The product was treated with an aqueous solution of sodium hydroxide to convert it to the hydroxide form and was washed with distilled water. The resin beads had an anion exchange capacity corresponding to 12,300 grains of calcium carbonate per cubic foot of a bed of the resin particles.

*Example 3*

A charge of 3 cc. of the batch of the chloromethylated copolymer beads described in Example 2, together with 15 cc. of benzene, was placed in a glass vessel equipped with a reflux condenser. The mixture was allowed to stand at room temperature for a period of one hour to swell the beads. Thereafter, 7 cc. of hexamethylphosphinous triamide was added. The resulting mixture was heated at a temperature of 80° C. for a period of 16 hours, then cooled. The product was separated, was washed with diethyl ether, then with water. The beads were treated with an aqueous 1-normal solution of sodium hydroxide and were washed with water. The product had an anion exchange capacity corresponding to 11,900 grains of calcium carbonate per cubic foot of a bed of the resin particles.

We claim:

1. An insoluble resinous quaternary phosphonium composition suitable for the removal of anions from fluids, which comprises an insoluble cross-linked copolymer of a mixture of from 80 to 99.5 per cent by weight of at least one monovinyl aromatic compound selected from the group consisting of monovinyl aromatic hydrocarbons of the benzene series and nuclear chlorinated derivatives thereof, and from 20 to 0.5 per cent of a divinyl aromatic hydrocarbon, the said copolymer containing on the aromatic nuclei substituent groups having the general formula:

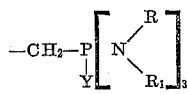

wherein R and R₁ each represents an alkyl radical containing from one to four carbon atoms, and Y is an anion, the number of said substituent groups being at least two for every ten aromatic nuclei in the copolymer.

2. An insoluble resinous quaternary phosphonium composition suitable for the removal of anion from fluids which comprises an insoluble cross-linked copolymer of a mixture of from 80 to 99.5 per cent by weight of at least one monovinyl aromatic compound selected from the group consisting of monovinyl aromatic hydrocarbon of the benzene series and nuclear chlorinated derivatives thereof, and from 20 to 0.5 per cent of a divinyl aromatic hydrocarbon, said copolymer containing on the aromatic nuclei substituent groups having the general formula:

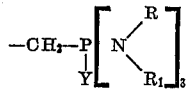

wherein R and R₁ each represents an alkyl radical containing from one to four carbon atoms and Y is an anion, the number of said substituent groups being between four and ten for every ten aromatic nuclei in the copolymer.

3. An insoluble resinous quaternary phosphonium composition as claimed in claim 2, which comprises an insoluble cross-linked copolymer is a copolymer of at least 80 per cent by weight of styrene, a lesser amount of ethylvinylbenzene and from 0.5 to 10 per cent of divinylbenzene, containing on the aromatic nuclei thereof substituent groups having the general formula:

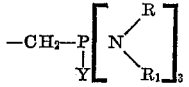

wherein R and R₁ each represents an alkyl radical containing from 1 to 4 carbon atoms and Y is an anion.

4. An insoluble resinous quaternary phosphonium composition as claimed in claim 2, wherein the insoluble cross-linked copolymer contains on the aromatic nuclei substituent groups having the formula:

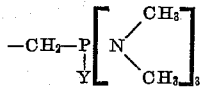

wherein Y is an anion.

5. An insoluble resinous quaternary phosphonium composition as claimed in claim 2, wherein the insoluble cross-linked copolymer contains on the aromatic nuclei substituent group having the formula:

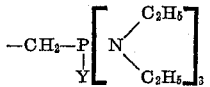

wherein Y is an anion.

6. A method of making a quaternary phosphonium anion exchange resin wherein an insoluble cross-linked copolymer of a mixture of from 80 to 99.5 percent by weight of at least one monovinyl aromatic compound selected from the group consisting of monovinyl aromatic hydrocarbons of the benzene series and nuclear chlorinated derivatives thereof, and from 20 to 0.5 percent of a divinyl aromatic hydrocabon, said copolymer containing on the aromatic nuclei at least two substituent chloromethyl groups for every ten aromatic nuclei in the copolymer, is reacted with a hexaalkylphosphinous triamide having the general formula:

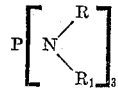

wherein R and R₁ each represents an alkyl radical containing from one to four carbon atoms by heating the copolymer in the form of small particles in admixture with the hexaalykylphosphinous triamide at reaction temperatures between 60° and 150° C.

7. A method of making a quaternary phosphonium anion exchange resin as claimed in claim 6, wherein the insoluble cross-linked copolymer containing on its aromatic nuclei substituent chloromethyl groups in the form of small particles is suspended in an inert organic liquid which is capable of swelling the particles of the insoluble copolymer and the particles are then reacted with a hexaalkylphosphinous triamide having the formula:

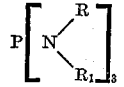

wherein R and R₁ each represents an alkyl radical containing from one to four carbon atoms by heating the swollen copolymer particles in admixture with the hexaalkylphosphinous triamide at reaction temperature between 60° and 150° C. in the presence of the organic liquid.

8. A method of making a quaternary phosphonium anion exchange resin as claimed in claim 7, wherein the insoluble cross-linked copolymer contains from four to ten substituent chloromethyl groups for every ten aromatic nuclei in the copolymer.

9. A method of making a quaternary phosphonium anion exchange resin as claimed in claim 7, wherein the insoluble cross-linked copolymer is a copolymer of at least 80 per cent by weight of styrene, a lesser amount of ethylvinylbenzene and from 0.5 to 10 per cent of divinylbenzene.

10. A method of making a quaternary phosphonium anion exchange resin as claimed in claim 7, wherein the insoluble cross-linked copolymer containing substituent chloromethyl groups on its aromatic nuclei is reacted with hexamethylphosphinous triamide.

11. A method of making a quaternary phosphonium anion exchange resin as claimed in claim 7, wherein the insoluble cross-linked copolymer containing substituent chloromethyl groups on its aromatic nuclei is reacted with hexaethylphosphinous triamide.

No references cited.